T. H. Weaver,

Churn Dasher.

No. 107,138. Patented Sep. 6, 1870.

Witnesses:
D. S. Mabee
Alex. F. Roberts

Inventor:
T. H. Weaver
per Munn & Co.
Attorneys.

United States Patent Office.

THOMAS H. WEAVER, OF MARIETTA, GEORGIA.

Letters Patent No. 107,138, dated September 6, 1870.

IMPROVEMENT IN CHURN-DASHER.

The Schedule referred to in these Letters Patent and making part of the same.

*To all whom it may concern:*

Be it known that I, THOMAS H. WEAVER, of Marietta, in the county of Cobb and State of Georgia, have invented a new and improved Churn-Dasher; and I do hereby declare that the following is a full, clear, and exact description thereof, which will enable others skilled in the art to make and use the same, reference being had to the accompanying drawing forming part of this specification.

This invention relates to improvements in churn-dashers, and consists in a short cylinder of sheet or cast metal, with perforations in the sides, and having a perforated disk at the center, to the center of which is applied a screw-threaded tube, by which the dasher-handle is attached.

Similar letters of reference indicate corresponding parts.

Figure 1:
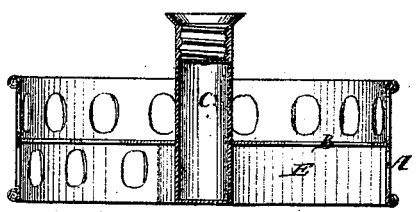
Figure 1 is a sectional elevation of my improved dasher.
Figure 2:
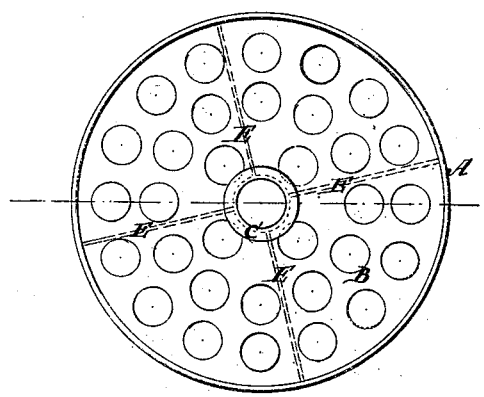
Figure 2 is a plan view.

A is the perforated metallic cylinder, which is, preferably, about the size of the interior of the hollow vessel in which it works.

B is the perforated disk, attached to the cylinder at or about the center, dividing it radially thereat.

C is the screw-threaded tube for attaching the handles.

The disk is strengthened by radial arms E, of thin metal, arranged so that they move up and down in the churn edgewise.

This dasher works in the cylinder in the manner of a piston, and nearly all the cream therein must be forced through the holes in the cylinder A and the disk B at each movement, thereby causing an intense agitation, calculated to produce the desired result very rapidly.

My improved churn-dasher will churn the milk or cream more thoroughly and in less time than any dasher known to me, for the following reasons—that, from its peculiar formation, it forces the air through the milk in every direction, perpendicularly and laterally, both in the downward and upward stroke, and with such force and friction that every particle of the milk is quickly warmed up to the butter-making degree.

Furthermore, the action of the upward stroke is such that it will churn the milk itself in two-thirds more time than the downward stroke would, thereby, with the effect of the latter added, shortening the time of churning, by dashers having a downward projection only, at least one-third.

This advantage of the upward stroke is caused by the partition-plate being in the center or below the top of the cylinder, causing the cylinder to project above it. This projection above the partition-plate causes a pressure in the upward stroke, the same as the projection below the plate does in the downward, to not so great a degree, because the air has been forced out to a considerable extent in the downward stroke.

The cylinder being perpendicular or straight on the sides, is a great advantage in my dasher, because it is parallel, the whole width of the cylinder, with the side of the churn, and thereby retains the pressure from top to bottom, both in the downward and upward stroke. This pressure cannot be maintained only when there is a rim or projection below, in the downward stroke, or above in the upward.

The common old-style "Dutch-churn" dasher (not having any rim) has very little power. A beveled or cone-shaped dasher cannot maintain an even pressure, because the suction, being entirely within the inverted cup or cone, will be certain to bear more on one side than the other, (in practice this is so, at least.) Neither does a beveled dasher retain its pressure in the upward stroke. So soon as the attempt is made to raise it up, it loses its power, because its sides are not perpendicular and parallel with the sides of the churn.

My reason for putting the partition-plate in the center is for two or three objects. One is that, by having it there, I have a rim or projection above and below, which I could not have if I put it in the bottom or top. I could only have one in either case.

Another is, that it adds very much to the strength and durability of the dasher, and another is, that it is better adapted to straight-sided rim.

Having thus described my invention,

I claim as new and desire to secure by Letters Patent—

A churn-dasher, consisting of the perforated cylinder A, with a perforated disk, B, and the shaft C, the disk being attached to the cylinder at the center of its length, and dividing it radially, and the tube C being attached to the disk, all substantially as specified.

THOMAS H. WEAVER.

Witnesses:
J. M. WILSON,
SANFORD GORHAM.